US009286557B2

(12) United States Patent
Deffeyes et al.

(10) Patent No.: US 9,286,557 B2
(45) Date of Patent: Mar. 15, 2016

(54) OPTIMIZING QUICK RESPONSE CODE CAPACITY USING GRAY LUMINANCE

(71) Applicant: INTERNATIONAL BUSINESS MACHINES CORPORATION, Armonk, NY (US)

(72) Inventors: Suzanne C. Deffeyes, Austin, TX (US); Grant D. Miller, Arvada, CO (US); Nader M. Nassar, Yorktown Heights, NY (US); Richard J. Newhook, Egg Harbor City, NJ (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/199,118

(22) Filed: Mar. 6, 2014

(65) Prior Publication Data
US 2015/0254542 A1    Sep. 10, 2015

(51) Int. Cl.
*G06K 19/06*    (2006.01)
*G06K 7/14*    (2006.01)

(52) U.S. Cl.
CPC ........ *G06K 19/06037* (2013.01); *G06K 7/1417* (2013.01); *G06K 7/1426* (2013.01); *G06K 19/0614* (2013.01)

(58) Field of Classification Search
CPC .............................................. G06K 19/06037
USPC ............. 235/462.04, 462.01, 462.07, 462.25, 235/494
See application file for complete search history.

(56) References Cited

U.S. PATENT DOCUMENTS

| 5,726,435 A | 3/1998 | Hara et al. |
| 6,276,607 B1* | 8/2001 | Sato ............................... 235/487 |
| 6,666,377 B1* | 12/2003 | Harris ....................... 235/462.25 |
| 8,376,240 B2 | 2/2013 | Kiliccote |
| 2009/0078772 A1* | 3/2009 | Ofek et al. ............... 235/462.04 |
| 2009/0166439 A1 | 7/2009 | Su |
| 2012/0024956 A1 | 2/2012 | Chen |
| 2013/0084004 A1* | 4/2013 | Tecu et al. ...................... 382/167 |

FOREIGN PATENT DOCUMENTS

WO    2012149778    8/2012

OTHER PUBLICATIONS

Anonymous. "Enhanced QR Code With Grayscale Detecting Method" ip.com. Jun. 2012. http://ip.com/IPCOM/000219120 (4 Pages).
Davidson, J.W., et al. "Code Selection Through Object Code Optimization" Department of Computer Science, University of Arizona, Nov. 1983. (21 Pages).

\* cited by examiner

*Primary Examiner* — Allyson Trail
(74) *Attorney, Agent, or Firm* — Tutunjian & Bitetto, P.C.; Jeff Tang (57) ABSTRACT

A system and methods are provided. A method includes determining a set of Grayscale bands providing an increase in a Quick Response Code data capacity that is an integer multiple of the Quick Response Code data capacity provided by a Black and White Quick Response Code that uses only Black and White to represent data. The method further includes generating, using a processor, a Grayscale Quick Response Code using the determined set of Grayscale bands to represent the data.

20 Claims, 5 Drawing Sheets

OPTIMIZING QUICK RESPONSE CODE CAPACITY USING GRAY LUMINANCE

BACKGROUND

1. Technical Field

The present principles relate generally to Quick Response (QR) Codes and, in particular, to optimizing Quick Response Code capacity using Gray luminance.

2. Description of the Related Art

QR Code®, which is the abbreviated form of "Quick Response Code", is the trademark for a type of two-dimensional barcode (or matrix barcode). A barcode is essentially an optically machine-readable label that is attached to item and can include information, e.g., for that item.

Quick Response Codes were first designed for the automotive industry. However, Quick Response Codes have recently become popular outside that industry due to their fast readability and large storage capacity compared to standard Universal Product Codes (UPCs). A Quick Response Code includes Black modules (square dots) arranged in a square pattern on a white background. The encoded information can be made up of four standardized types ("modes") of data (numeric, alphanumeric, byte/binary, and Kanji), or through supported extensions, virtually any kind of data.

In the prior art, White blocks in a Quick Response Code have been used for hidden messages. However, there is a need for further capacity for Quick Response Codes.

SUMMARY

According to an aspect of the present principles, a method is provided. The method includes determining a set of Grayscale bands providing an increase in a Quick Response Code data capacity that is an integer multiple of the Quick Response Code data capacity provided by a Black and White Quick Response Code that uses only Black and White to represent data. The method further includes generating, using a processor, a Grayscale Quick Response Code using the determined set of Grayscale bands to represent the data.

According to another aspect of the present principles, a system is provided. The system includes a memory for storing a set of Grayscale bands providing an increase in a Quick Response Code data capacity that is an integer multiple of the Quick Response Code data capacity provided by a Black and White Quick Response Code that uses only Black and White to represent data. The system further includes a Quick Response Code generator for generating a Grayscale Quick Response Code using the determined set of Grayscale bands to represent the data.

According to yet another aspect of the present principles, a method is provided. The method includes determining a set of Grayscale bands providing an increase in a Quick Response Code data capacity that is an integer multiple of the Quick Response Code data capacity provided by a Black and White Quick Response Code that uses only Black and White to represent data. The method further includes generating, using a processor, a Grayscale Quick Response Code using the determined set of Grayscale bands to represent the data. The method also includes establishing a calibration for a median brightness level for a Quick Response Code optical reader using a Grayscale color code primer in the Quick Response Code that assigns a predetermined percentage of Gray to predetermined elements of the Quick Response Code. The set of Grayscale bands includes sixteen shades of Gray, and the integer multiple is equal to four to provide four times the amount of data per pixel than the Black and White Quick Response Code.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to optimizing Quick Response Code capacity using Gray luminance. Thus, the present principles are directed to increasing the data presented by a Quick Response Code. While current Quick Response Codes have a capacity that is restricted to the "area" of the Quick Response Code, the present principles advantageously increase the color bands into 16 levels to enable the representation of more data using the same size Quick Response Code.

While described primarily with respect to Quick Response Codes, it is to be appreciated that the present principles can be applied to any type of two-dimensional barcode. That is, given the teachings of the present principles provided herein, one of ordinary skill in the art will readily appreciate that the present principles can be applied to other types of two-dimensional barcodes than Quick Response Codes, while maintaining the spirit of the present principles.

Figure 1:
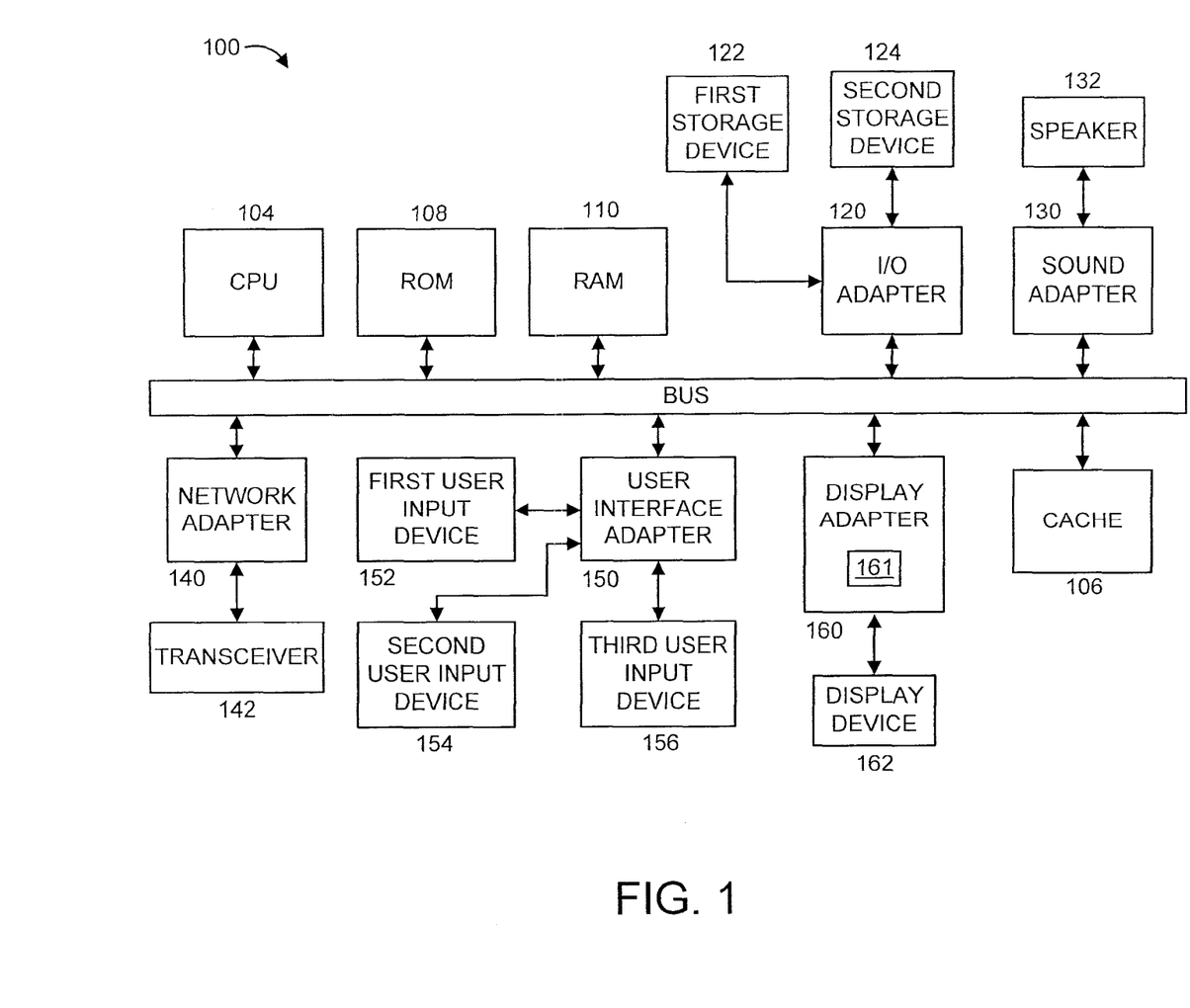
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. Processing system 100 is enabled to generate Quick Response Codes in accordance with the present principles and to read such Quick Response Codes.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130. A transceiver 142 is operatively coupled to system bus 102 by network adapter 140. A display device 162 is operatively coupled to system bus 102 by display adapter 160. While a processor 104 is shown as an element of processing system 100, it is to be appreciated than any of the adapters (sound adapter 130, network adapter 140, and display adapter 160) can include their own respective processor(s). In the example of FIG. 1, at least the display adapter 160 includes a processor 161 which can be used to generate a Quick Response Code in accordance with the present principles.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, an optical scanner, a device incorporating the functionality of at least two of the preceding devices, and so forth. In an embodiment, the user input devices 152, 154, and 156 will include at least one device capable of reading a Quick Response Code such as, for example, but not limited to, an image capture device (e.g., a camera), a scanner, and so forth. Of course, other types of input devices can also be used, while maintaining the spirit of the present principles. The user input devices 152, 154, and 156 are used to input and output information to and from system 100. In the case of a scanner as an input device, the same would be equipped to read Grayscale versus only Black and White.

Of course, the processing system 100 may also include other elements (not shown), as readily contemplated by one of ordinary skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, while essentially presented above in the configuration of a computer, the processing system 100 can be any of a smart phone or a scanner itself or some other device having the capability to generate and/or read Quick Response Codes in accordance with the present principles. For example, in an embodiment, two implementations of processing system 100 can be used, with one used for generating Quick Response Codes in accordance with the present principles, and the other one used for reading Quick Response Codes in accordance with the present principles. These and other variations of the processing system 100 are readily contemplated by one of ordinary skill in the art given the teachings of the present principles provided herein.

Figure 2:
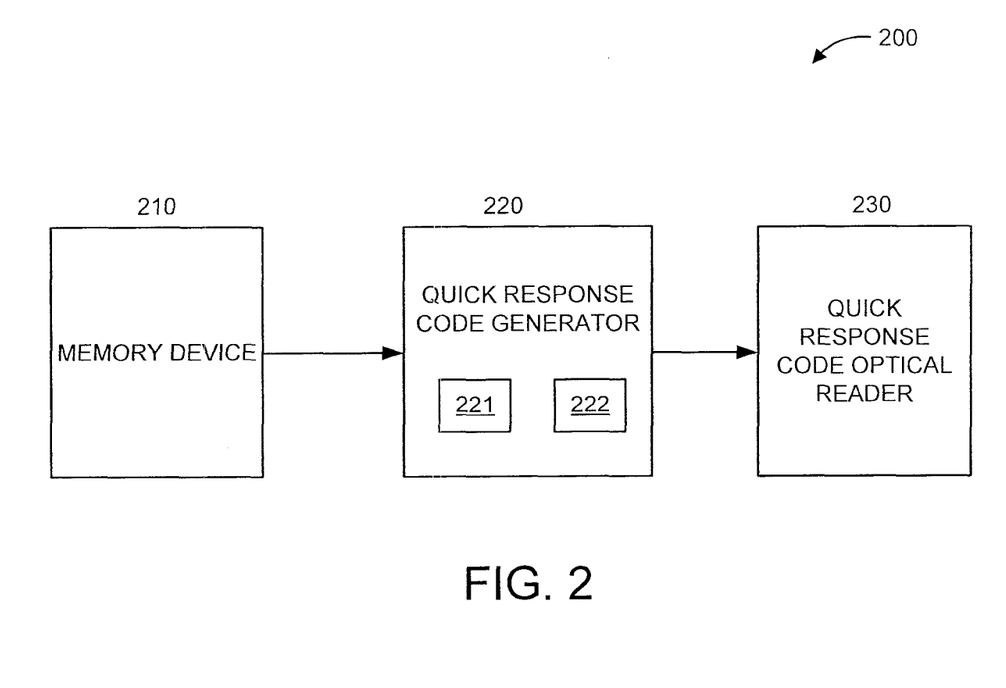
FIG. 2 shows an exemplary system 200 for generating optimized Quick Response Codes, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
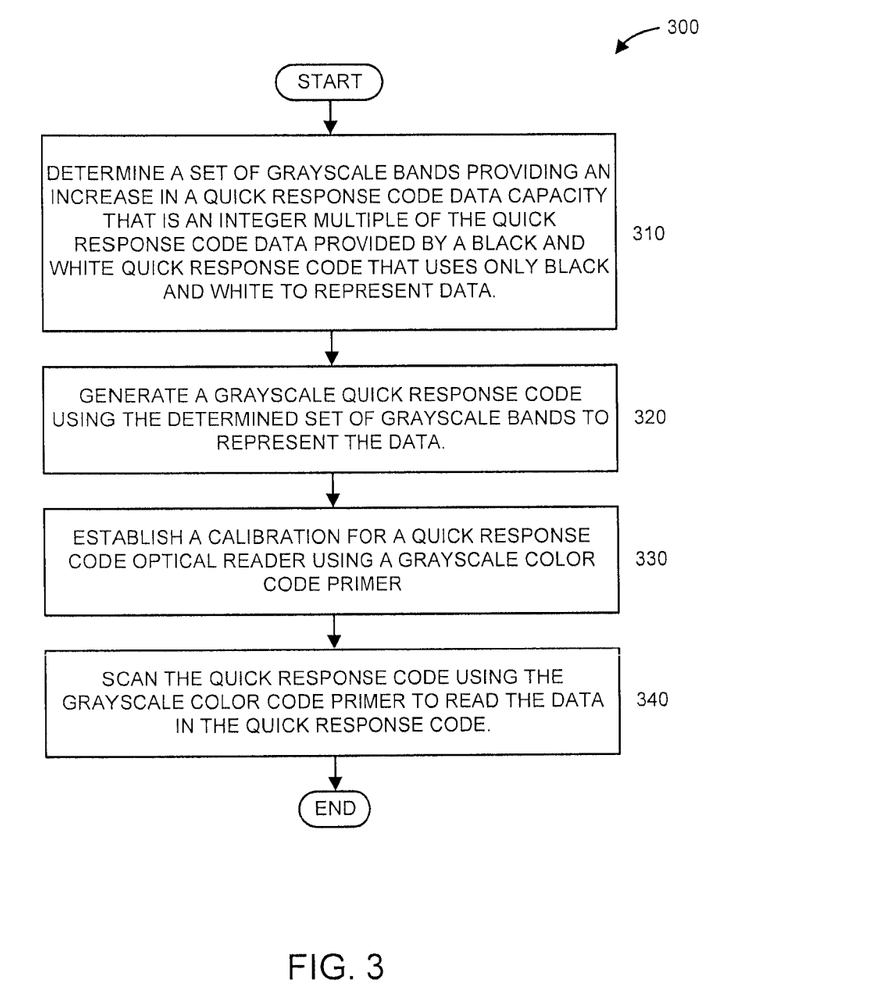
FIG. 3 shows an exemplary method 300 for generating optimized Quick Response Codes, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for generating optimized Quick Response Codes, in accordance with an embodiment of the present principles.

The system 200 includes a memory device 210 for storing a set of Grayscale bands (and/or information representative thereof) providing an increase in a Quick Response Code data capacity that is an integer multiple of the Quick Response Code data capacity provided by a Black and White Quick Response Code that uses only Black and White to represent data.

The system 200 further includes a Quick Response Code generator 220 for generating a Grayscale Quick Response Code using the set of Grayscale bands to represent the data in the Quick Response Code. In an embodiment, the Quick Response Code generator 220 includes a processor 221 and a Quick Response Code output portion 222. The Quick Response Code output portion 222 outputs the Quick Response Code generated using the set of Grayscale bands and the processor 221. The Quick Response Code output portion 222 can be and/or otherwise involve a display device, a printer, and so forth, as readily contemplated by one of ordinary skill in the art, given the teachings of the present principles provided herein, while maintaining the spirit of the present principles. The Quick Response Code generator 220 also establishes a calibration for a Quick Response Code optical reader (hereinafter described as element 230) using a Grayscale color code primer.

The system 200 also includes a Quick Response Code optical reader 230 for scanning the Quick Response Code using the set of Grayscale bands. The Quick Response Code optical reader 230 can be, e.g., a camera, a scanner, and so forth.

While shown as part of system 200 in the embodiment of FIG. 2, it is to be appreciated that in other embodiments, the Quick Response Code optical reader 230 can be implemented as a separate entity from system 200. These and other variations to system 200 are readily contemplated by one of ordinary skill in the art given the teachings of the present principles provided herein, while maintaining the spirit of the present principles.

FIG. 3 shows an exemplary method 300 for generating optimized Quick Response Codes, in accordance with an embodiment of the present principles.

At step 310, determine a set of Grayscale bands providing an increase in a Quick Response Code data capacity that is an integer multiple of the Quick Response Code data capacity provided by a Black and White Quick Response Code that uses only Black and White to represent data. In an embodiment, the set of Grayscale bands includes sixteen shades of Gray, and the integer multiple is equal to four to provide four times the amount of data per pixel than the Black and White Quick Response Code. In an embodiment, the set of Grayscale bands includes eight shades of Gray, and the integer multiple is equal to three to provide three times the amount of data per pixel than the Black and White Quick Response Code.

Further regarding step 310, it is to be appreciated that the number of Grayscale bands are determined using the following formula:

$$\text{Number of Grayscale bands} = 2^N$$

where N is the density multiplier. The number of Grayscale bands can also be interchangeably referred to as the data density. In classic QR codes, the value of N is equal to one, meaning two Grayscale bands or a data density of 2. If N is equal to three, then eight Grayscale bands are provided. If N is equal to four, then sixteen grayscale bands are provided.

At step 320, generate a Grayscale Quick Response Code using the determined set of Grayscale bands to represent the data.

At step 330, establish a calibration for a Quick Response Code optical reader using a Grayscale color code primer. In an embodiment, the calibration for the Quick Response Code calibrates a median brightness level for the Quick Response Code optical reader. In an embodiment, the Quick Response Code comprises large markers and small markers, and the Grayscale color code primer includes displaying only one of the large markers and all of the small markers in a predetermined percentage of Gray to establish a median brightness level for the Quick Response Code optical reader. As used in the context of the preceding sentence, "displaying" can mean presenting on a display device and/or presenting on an item (e.g., paper, product, and so forth). In an embodiment, the predetermined percentage of Gray is fifty percent. Of course, the present principles are not limited to solely the preceding and, thus, different numbers of markers, different sizes, and different percentages can also be used in accordance with the teachings of the present principles, while maintaining the spirit of the present principles.

At step 340, scan the Quick Response Code using the Grayscale color code primer to read the data in the Quick Response Code.

Existing Quick Response Codes enable the end product (to which the code is associated) to carry much more information that 1-dimensional barcodes. In a real life scenario, a "version 4" Quick Response Code holds 50 characters, which enables consumers to scan the code and pull related information from the Internet. Larger Quick Response Codes can store higher amounts of data. However, this is limited by both the size of the data blocks and available surface area. For example, a "version 40" Quick Response Code is limited to 1852 characters, while nearing the limits of practical size and resolution. This limitation is a compelling factor from adding more information which is needed, particularly in retail applications where consumers could benefit from more data represented by a Quick Response Code. However, it is to be appreciated that the present principles are not limited solely to retail applications and, thus, can be applied to a myriad of different applications as readily determined by one of ordinary skill in the art, given the teachings of the present principles provided herein. For example, Quick Response Codes in accordance with the present principles can be used in the consumer products market, supply/chain operation, and in about any operation where a Quick Response Code is currently used. Thus, these and other applications to which the present principles can be applied are readily determined by one of ordinary skill in the art, given the teachings of the present principles provided herein.

Thus, the present principles advantageously introduce the concept of extending Quick Response Code capacity. With the knowledge that existing Quick Response Codes are served using only two colors (Black and White), the use of a Grayscale Quick Response Code in accordance with the present principles will increase the capacity of Quick Response Codes. A Quick Response Code scanner would be equipped to read Grayscale versus only Black and White.

In an embodiment, the aforementioned extension of the Quick Response Code capacity is based on 8 bands of Grayscale. In such a case, each band would be represented with 3 bits, which is three times higher than the capacity of a typical (Black and White) Quick Response Code. That is, the use of 8 shades of Gray results in each pixel being able to represent 3 bits of data, which is 3 times higher than the amount of data that can be represented using Black/White. In another embodiment, the aforementioned extension of the Quick Response Code capacity is based on 16 bands of Grayscale. In an embodiment, we divide the Grayscale into 16 bands. In such a case, each band would be represented with 4 bits, which is four times higher than the capacity of a typical (Black and White) Quick Response Code. That is, the use of 16 shades of Gray results in each pixel being able to represent 4 bits of data, which is 4 times higher than the amount of data that can be represented using Black/White. Of course, the present principles are not limited to the preceding numbers of Gray shades and, thus, other numbers of Gray shades can also be used in accordance with the teachings of the present principles, while maintaining the spirit of the present principles.

In an embodiment, a Quick Response Code in accordance with the present principles will include registration/calibration zones. To that end, in an embodiment, one large (and all small) markers are displayed in 50% Gray, to calibrate the median brightness level. Of course, other marker selections and other percentages can be used for registration/calibration, while maintaining the spirit of the present principles.

Figure 4:
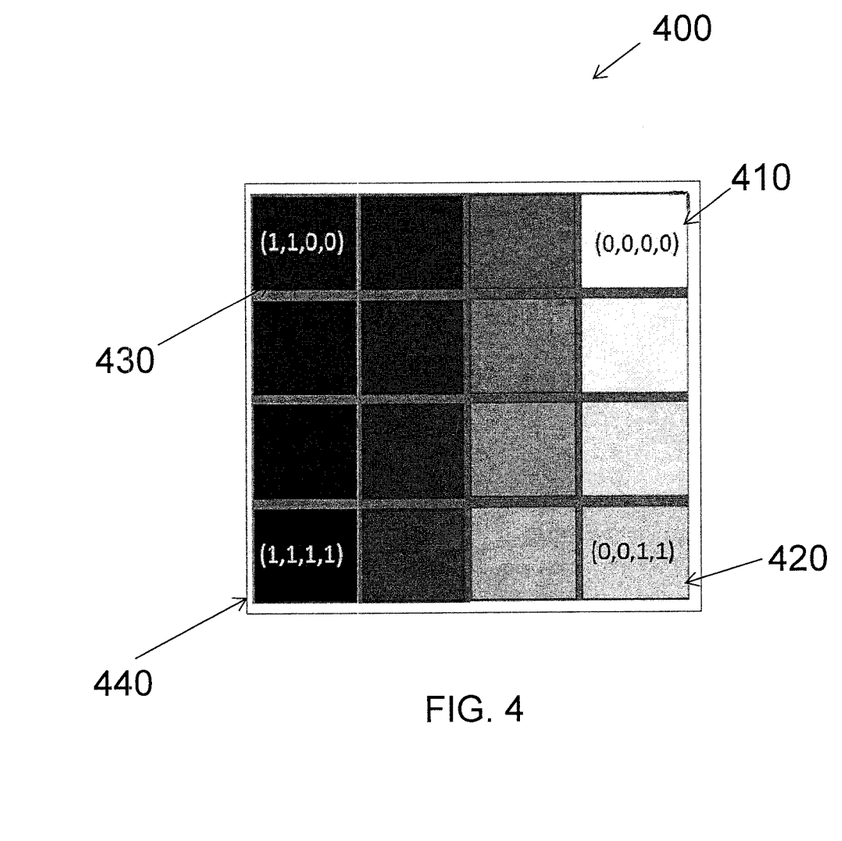
FIG. 4 shows an exemplary Quick Response Code 400 segmented into 16 Grayscale bands, in accordance with an embodiment of the present principles.

FIG. 4 shows an exemplary Quick Response Code 400 segmented into 16 Grayscale bands, in accordance with an embodiment of the present principles. The 16 Grayscale bands, or 16 shades of Gray, are provided in increasing darkness from top to bottom and right to left. The shade of Gray represented in the upper right corner 410 of the Quick Response Code 400 represents a value of (0, 0, 0, 0). The shade of Gray represented in the lower right corner 420 of the Quick Response Code 400 represents a value of (0, 0, 1, 1). The shade of Gray represented in the upper left corner 430 of the Quick Response Code 400 represents a value of (1, 1, 0, 0). The shade of Gray represented in the lower left corner 440 of the Quick Response Code 400 represents a value of (1, 1, 1, 1).

Figure 5:
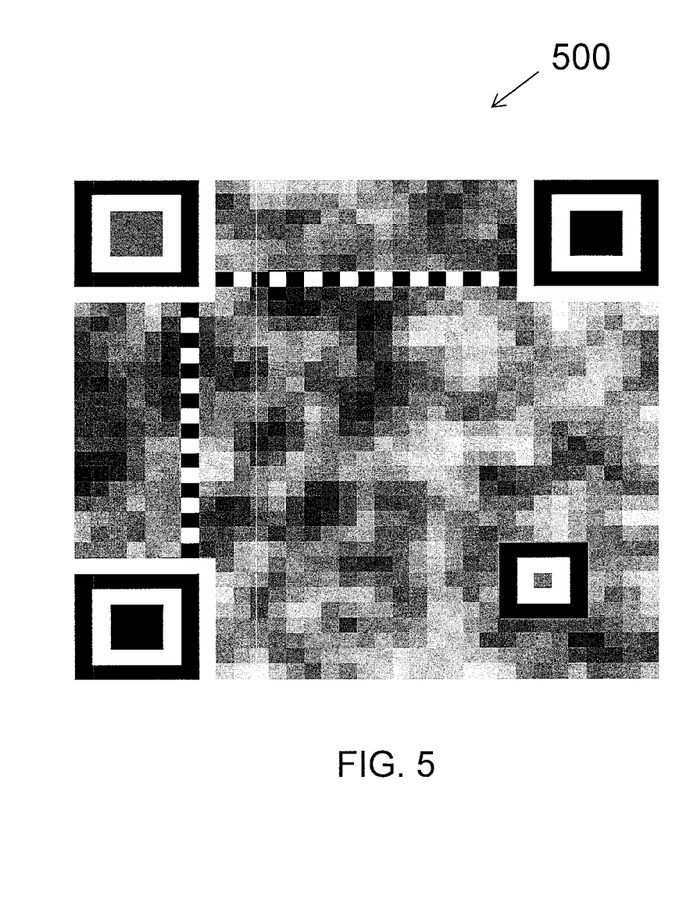
FIG. 5 shows an exemplary Quick Response Code 500 using 16 Grayscale bands, in accordance with an embodiment of the present principles.

FIG. 5 shows an exemplary Quick Response Code 500 using 16 Grayscale bands, in accordance with an embodiment of the present principles. The Quick Response Code 500, in using the 16 Grayscale bands versus simply Black and White, is advantageously able to carry significantly more data that Black and White Quick Response Codes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   determining a set of Grayscale bands providing an increase in a Quick Response Code data capacity that is an integer multiple of the Quick Response Code data capacity provided by a Black and White Quick Response Code that uses only Black and White to represent data; and
   generating, using a processor, a Grayscale Quick Response Code using the determined set of Grayscale bands to represent the data.

2. A method of claim 1, further comprising establishing a calibration for a Quick Response Code optical reader using a Grayscale color code primer in the Quick Response Code.

3. The method of claim 2, wherein the calibration for the Quick Response Code calibrates a median brightness level for the Quick Response Code optical reader.

4. The method of claim 2, wherein the Quick Response Code comprises large markers and small markers, and the Grayscale color code primer comprises displaying only one of the large markers and all of the small markers in a predetermined percentage of Gray to establish a median brightness level for the Quick Response Code optical reader.

5. The method of claim 4, wherein the predetermined percentage of Gray is fifty percent.

6. The method of claim 2, further comprising scanning the Quick Response Code using the Grayscale color code primer to read the data in the Quick Response Code.

7. The method of claim 1, wherein the set of Grayscale bands comprises sixteen shades of Gray, and the integer multiple is equal to four to provide four times the amount of data per pixel than the Black and White Quick Response Code.

8. The method of claim 1, wherein the set of Grayscale bands comprises eight shades of Gray, and the integer multiple is equal to three to provide three times the amount of data per pixel than the Black and White Quick Response Code.

9. A non-transitory article of manufacture tangibly embodying a computer readable program which when executed causes a computer to perform the steps of claim 1.

10. A system, comprising:
    a memory for storing a set of Grayscale bands providing an increase in a Quick Response Code data capacity that is an integer multiple of the Quick Response Code data capacity provided by a Black and White Quick Response Code that uses only Black and White to represent data; and
    a Quick Response Code generator for generating a Grayscale Quick Response Code using the determined set of Grayscale bands to represent the data.

11. A system of claim 10, wherein said Quick Response Code generator establishes a calibration for a Quick Response Code optical reader using a Grayscale color code primer in the Quick Response Code.

12. The system of claim 11, wherein the calibration for the Quick Response Code calibrates a median brightness level for the Quick Response Code optical reader.

13. The system of claim 11, wherein the Quick Response Code comprises large markers and small markers, and the Grayscale color code primer comprises displaying only one of the large markers and all of the small markers in a predetermined percentage of Gray to establish a median brightness level for the Quick Response Code optical reader.

14. The system of claim 13, wherein the predetermined percentage of Gray is fifty percent.

15. The system of claim 10, wherein the set of Grayscale bands comprises sixteen shades of Gray, and the integer multiple is equal to four to provide four times the amount of data per pixel than the Black and White Quick Response Code.

16. The system of claim 10, wherein the set of Grayscale bands comprises eight shades of Gray, and the integer multiple is equal to three to provide three times the amount of data per pixel than the Black and White Quick Response Code.

17. A method, comprising:
    determining a set of Grayscale bands providing an increase in a Quick Response Code data capacity that is an integer multiple of the Quick Response Code data capacity provided by a Black and White Quick Response Code that uses only Black and White to represent data;
    generating, using a processor, a Grayscale Quick Response Code using the determined set of Grayscale bands to represent the data; and
    establishing a calibration for a median brightness level for a Quick Response Code optical reader using a Grayscale color code primer in the Quick Response Code that assigns a predetermined percentage of Gray to predetermined elements of the Quick Response Code,
    wherein the set of Grayscale bands comprises sixteen shades of Gray, and the integer multiple is equal to four to provide four times the amount of data per pixel than the Black and White Quick Response Code.

18. The method of claim 17, wherein the Quick Response Code comprises large markers and small markers, and the Grayscale color code primer comprises displaying only one of the large markers and all of the small markers in a predetermined percentage of Gray to establish the median brightness level for the Quick Response Code optical reader.

19. The method of claim 17, further comprising scanning the Quick Response Code using the Grayscale color code primer to read the data in the Quick Response Code.

20. A non-transitory article of manufacture tangibly embodying a computer readable program which when executed causes a computer to perform the steps of claim 17.

* * * * *